(12) United States Patent
Gantz (10) Patent No.: US 7,044,369 B2
(45) Date of Patent: May 16, 2006

(54) METHOD AND SYSTEM FOR PURCHASING ITEMS

(75) Inventor: Ruth Gantz, Tel Aviv (IL)

(73) Assignee: Buypass Systems (1999) Ltd., Rishon Lezion (IL)

( * ) Notice: Subject to any disclaimer, the term of this patent is extended or adjusted under 35 U.S.C. 154(b) by 91 days.

(21) Appl. No.: 10/362,575

(22) PCT Filed: Aug. 23, 2001

(86) PCT No.: PCT/IL01/00788

§ 371 (c)(1),
(2), (4) Date: Aug. 4, 2003

(87) PCT Pub. No.: WO02/17261

PCT Pub. Date: Feb. 28, 2002

(65) Prior Publication Data

US 2004/0026503 A1 Feb. 12, 2004

(30) Foreign Application Priority Data

Aug. 24, 2000 (IL) .................................... 138054
May 23, 2001 (IL) .................................... 143336

(51) Int. Cl.
  *G06F 7/08* (2006.01)
(52) U.S. Cl. ...................... 235/381; 235/383; 235/385
(58) Field of Classification Search ................ 235/383,
    235/375, 381, 385, 462.46, 472.01, 472.02,
    235/472.03; 340/5.91, 5.92, 572.1, 572.3,
    340/572.4, 825.36; 335/285; 186/62, 61,
    186/59
See application file for complete search history.

(56) References Cited

U.S. PATENT DOCUMENTS

| | | | |
|---|---|---|---|
| 4,141,078 A | | 2/1979 | Bridges, Jr. et al. |
| 4,215,342 A | * | 7/1980 | Horowitz .................. 340/572.4 |
| 4,575,624 A | | 3/1986 | Klinkhardt |
| 4,973,952 A | * | 11/1990 | Malec et al. ................ 340/5.91 |
| 5,225,807 A | * | 7/1993 | Zhou et al. .............. 340/572.3 |
| 5,424,524 A | | 6/1995 | Ruppert et al. |
| 5,557,088 A | | 9/1996 | Shimizu et al. |
| 5,594,228 A | | 1/1997 | Swartz et al. |
| 5,640,002 A | * | 6/1997 | Ruppert et al. ........ 235/462.46 |
| 5,821,513 A | * | 10/1998 | O'Hagan et al. ........... 235/383 |
| 6,084,528 A | * | 7/2000 | Beach et al. ................. 340/5.9 |

FOREIGN PATENT DOCUMENTS

| | | |
|---|---|---|
| EP | 0 533 139 A1 | 3/1993 |
| EP | 0 856 812 A2 | 8/1998 |
| WO | WO 89/02628 | 3/1989 |

\* cited by examiner

*Primary Examiner*—Daniel Stcyr
*Assistant Examiner*—Daniel A. Hess
(74) *Attorney, Agent, or Firm*—Browdy and Neimark, PLLC (57) ABSTRACT

A customer station for use in an items' purchasing system in a supermarket or other retail store is presented. The customer station has an identification assembly, a control unit, a data presentation unit for presenting to the customer information related to selected items, and a deactivator. The identification assembly is operable to identify a nature of an item of customer's interest, and generate data indicative of information related to the item of interest to be presented to the customer. The control unit has a processing system responsive to the generated data indicative of the information related to the item to generate data indicative of the entire sum to be paid by the customer which is to be presented to the customer. The deactivator is operable to deactivate a security tag attached to the item. The entire customer station or at least the identification assembly and the data presentation unit are incorporated in a unit mountable on a supermarket trolley.

21 Claims, 5 Drawing Sheets

METHOD AND SYSTEM FOR PURCHASING ITEMS

FIELD OF THE INVENTION

This invention is in the field of automatic payment and security techniques for use by customers while purchasing items in supermarkets and other retail stores, and relates to a customer station for use in an item purchasing system and method, as well as a magnetic assembly for use in such system, and a supermarket trolley carrying the customer station.

BACKGROUND OF THE INVENTION

Supermarket trolleys are familiar devices, and almost no customer can manage without a trolley. As a result, the supermarket trolley may serve as a point of reference for and of the customer during his/her visit to the supermarket.

The conventional technique for purchasing items generally consists of the following. A customer enters the store and travels along the aisles with his shopping trolley, and selects and inserts into the trolley the items he wishes to purchase. When the customer completes his shopping, he comes to the cashier, who takes out each item and scans a bar code presented thereon, thereby entering the data indicative of the item's price (and possible discounts) into a computer that calculates the entire sum to be paid by the customer.

Items in the supermarket may be provided with security tags, for example, magnetic tags aimed at avoiding thefts. Such a magnetic tag typically comprises two magnetic strips made of, respectively, hard magnetic and soft magnetic materials. The hard magnetic strip is shiftable between its passive state, in which it allows the detection of a response of the soft magnetic strip to an external magnetic field generated by the security system in the exit gate, and its active state, in which it prevents the detection of the response of the soft magnetic strip. In other words, the passive state of the hard magnetic strip corresponds to the active state of a magnetic tag, in which it can be detected, and the active state of the hard magnetic strip corresponds to the passive state of the tag, in which it is non-detectable. When an item carrying such an "active" magnetic tag (not deactivated) passes through a magnetic field region (created by the external security system), the latter detects changes in the magnetic field caused by the response of the tag (of the soft magnetic strip) and generates an alarm signal. To deactivate the magnetic tag, it should be exposed to a D.C. or permanent magnetic field, which activates the hard magnetic strip (i.e., causes its magnetization), thereby preventing the detection of the soft magnetic strip response to the external AC magnetic field.

Hence, if the items are provided with security tags, the cashier removes the security tag from the purchased item or deactivates the tag remaining on the item, thereby preventing the tag from being detected by the magnetic security system mounted in an exit gate. Needless to say that this procedure is both time and manpower consuming, and is therefore inconvenient for both the customers and the store.

Techniques enabling customers to perform some of the above operations on their own have been developed, and disclosed, for example in U.S. Pat. Nos. 5,424,524 and 5,557,088. Generally, these techniques provide a customer with a self-scanning means that can be mounted on a shopping trolley, thereby enabling the customer to carry out the following: scan the bar code on a selected item, have its price displayed, scan his credit card identification code, add the displayed value to an existing list of purchased (scanned) items, and finalize the transaction.

According to the technique of U.S. Pat. No. 5,424,524, the customer is also provided with a magnetic security assembly of the kind capable of deactivating a magnetic security element attached to each item. To prevent unscrupulous shoppers from deactivating the security strips without actually scanning the barcode (to ensure payment for the item), a personal scanner device utilizes magnet coils, which create D.C. magnetic fields only when the barcode scanner is activated. In other words, the activation of the barcode scanner (by pushing the scan button) simultaneously causes the barcode scanning and routing of a direct current through the coils of electromagnets to create the required D.C. magnetic field to deactivate the magnetic tag. This, however, causes additional complexity for the customer, if he changes his mind about purchasing an item that has already been scanned.

SUMMARY OF THE INVENTION

There is a need in the art to improve existing automatic payment and security systems by providing a novel system, which accommodates additional features facilitating both the customer and the store while purchasing items by customers.

The main idea of the present invention is associated with the following. It is often the case that customers are interested in various currently available sales in a specific store. It is a common procedure for a customer entering the store to look for advertisements related to sales while traveling along the aisles.

The present invention thus concerns the use of a customer station having a suitable identification means for identifying a potential buyer of a specific type of product and notifying him about the existing sale of this and/or additional relating types of products (e.g., by displaying the relevant information). Such an identification means (actually identifying the customer interested in the specific product) is preferably associated with a trolley mountable unit of the customer station. In this case, the identification means is responsive to the bar code being scanned by the customer, thereby identifying its nature (type) and the fact that the customer is interested in such type of products, and therefore may be interested in additional products of a related type. Thus, in response to the bar code scanning, sales related information is automatically presented to the customer, e.g., being presented on a self-scanning device mounted on the trolley as visual or audio data.

Alternatively, or additionally, the identification means may be associated with the aisles. In this case, the identification means is in the form of a sensor (e.g., optical sensor) identifying the customer passing through the aisle and pausing at a shelf with a specific type of product (being thereby indicative of the fact that the customer is interested in inspecting this specific shelf). As for the data presentation, it is preferably associated with the customer's trolley (which in this case is actuated by the sensor via RF or infrared signal transmission), but may also be associated with the "sensing" aisle itself.

Thus, according to one aspect of the present invention, there is provided a customer station for use in an items purchasing system in a supermarket or other retail store, the customer station comprising:

(a) an identification assembly capable of identifying nature of an item of a customer's interest, and generating data indicative of information related to the item of interest to be presented to the customer;

(b) a control unit having processing means responsive to the generated data indicative of the information related to the item, and generating data indicative of the entire sum to be paid by the customer which is to be presented to the customer;

(c) a data presentation unit for presenting to the customer information related to the selected items; and (d) a deactivator operable to deactivate a security tag attached to an item.

Preferably, the customer station also comprises a code reading/identification unit for identifying a customer and determining his payment card identification code, and generating data indicative thereof. Consequently, the same processing means of the control unit or an additional one may also be responsive to the data indicative of the entire sum and to the generated data related to the customer's payment card, so as to finalize the transaction.

In order to identify the item's nature, certain reference data is utilized. The reference data includes data representative of various items available in the store including their identification codes, nature and current prices, and preferably also includes data representative of the registered customers (i.e., those who have previously purchased item(s) in said store). The reference data is stored in a memory unit, which, preferably, is a part of the customer station, but may alternatively be part of a central station wireless connectable to the customer station.

The term "nature of an item" used herein signifies the type of a group the item belongs from a customer point of view. For example, if an item selected by the customer is milk it is reasonable to assume that the customer might be interested in dairy products. Similarly, if for example a customer passes next to baby food, he might be interested in diapers in general.

The term "information related to the item" used herein signifies at least one of the following: the nature and current price of the item, currently available sales, the existence, location of items of the same nature as defined above.

The term "item of customer's interest" used herein signifies at least one of the following: an item selected by the customer (i.e., scanned), or an item located in the aisle in the vicinity of the customer's current location.

The term "customer's payment card" used herein signifies any kind of a credit card, store card, union card, etc.

The term "security tag" signifies a label on an item carrying one or more security elements, which can be deactivated/reactivated by an external field.

The entire customer station may be incorporated in a trolley mountable unit. Alternatively, the control unit and/or memory unit may be a separate unit appropriately installed in the supermarket to be accessed by the customer. If the memory unit is a part of the customer station, it is equipped with a signal receiving means for receiving the updated contents of the reference data from a central station of the supermarket.

The deactivator is preferably a magnetic assembly operable to deactivate a security magnetic tag, so as to prevent identification of the selected item by an external security assembly (i.e., enabling identification of this item as a purchased one). The same magnetic assembly may be also operable to reactivate the previously deactivated security tag. Such a magnetic assembly capable of at least deactivating the magnetic tag may be part of the trolley mountable unit, or may be a stand alone unit accessible by customers in the store.

According to another broad aspect of the present invention, there is provided an items purchasing system for use in a supermarket or other retail store, the system comprising a central station for storing reference data, and a plurality of customer stations connectable to said central station, the customer's station comprising:

(a) a memory unit for storing said reference data, wherein the memory unit is equipped with a signal receiving means for receiving updated contents of the reference data from said central station;

(b) an identification assembly capable of identifying nature of an item of customer's interest, and generating data indicative of information related to the item of interest to be presented to the customer;

(c) a code reading/identification unit for identifying a customer and determining his payment card identification code, and generating data indicative thereof;

(d) a control unit having processing means responsive to the generated data indicative of the information related to the item, and generating data indicative of the entire sum to be paid by the customer which is to be presented to the customer, and having processing means-responsive to the data indicative of the entire sum and to the generated data related to the customer's payment card, so as to finalize transaction;

(e) a data presentation unit for presenting to the customer information related to the selected items; and (f) a deactivator operable to deactivate a security tag attached to the selected item, so as to prevent detection of the selected item carrying the deactivated tag by an external security system According to yet another aspect of the invention, there is provided a method of purchasing items in a store, the method comprising the steps of:

(i) identifying the nature of an item of a customer's interest, and generating data indicative of information related to the item of interest; and (ii) presenting the generated information to the customer in order to attract his attention.

The present invention provides for solving the following problem arising from automatic payment and security systems. A customer, after performing the purchasing procedure (i.e., scanning the barcode and deactivating the magnetic tag on a certain selected item), may change his mind and return the item onto the store shelf. In this case, the magnetic tag on this returned item should be reactivated, so as to remove this item from the list of items purchased by this specific customer, and to prevent another customer from taking advantage of the deactivated returned item and putting it in his trolley without paying (i.e., scanning the bar code thereon). With the conventional technique, this item would not be identified as a stolen item when leaving the supermarket To identify this item, an employee of the supermarket would have to compare the number of items in the trolley to the number of items appearing in the finalized bill.

To solve the above problem, according to the present invention, the deactivator is preferably a magnetic assembly (e.g., part of the customer's unit mounted on the trolley) operable to deactivate a magnetic security tag, and is also provided with a reactivation means. Hence, the customer, while deciding to return the item, has to reactivate the previously deactivated magnetic security element on the item.

The magnetic assembly according to the invention for deactivating/reactivating magnetic tags utilizes at least one permanent magnet. The deactivation of a magnetic tag utilizes a DC magnetic field created by at least one permanent magnet, and the reactivation of the tag utilizes an AC magnetic field (a spatial sinusoidal electro-magnetic field) created by the stable rotation of at least one permanent magnet. More than one permanent magnet can be used, either all of them or only some (those intended for the reactivation of a magnetic tag) being mounted for rotation. The use of several spaced-apart permanent magnets is preferred in order to increase the magnetic field regions created by the magnets, the magnetic assembly being therefore less sensitive to the location of a magnetic tag relative to the magnetic assembly. Preferably, the same permanent magnets are used for both deactivation and reactivation of a magnetic tag. The permanent magnets, while being located stationary (non-rotating) with respect to the magnetic tag, serve for deactivation thereof, and while being rotated, serve for reactivation of the tag.

Thus, according to yet another aspect of the present invention, there is provided a magnetic assembly for use in an item's purchasing system in a supermarket or other store, the magnetic assembly being applicable to a magnetic tag presented on an item and selectively operable for deactivating the tag to make it undetectable by an external magnetic security system, or reactivating the tag to allow its detection by the external magnetic security system, the magnetic assembly comprising at least one permanent magnet operable to create a DC magnetic field capable of deactivating the magnetic tag, and being mounted for rotation to create a spatial sinusoidal electro-magnetic field capable of reactivating the deactivated magnetic tag.

It should be understood that the construction can be such that a magnetic assembly operable to deactivate a magnetic tag is a part of the trolley mountable unit, and a magnetic assembly capable of reactivating the previously deactivated magnetic tag is a stand alone unit accessable by customers in the store.

Thus, according to yet another aspect of the present invention, there is provided a magnetic assembly applicable by its face to a magnetic tag presented on an item, the device being operable for reactivating a previously deactivated magnetic tag to allow detection of the tag by the external magnetic security system, the magnetic assembly comprising a predetermined number of permanent magnets mounted for rotation, a stable rotation state of all the magnets resulting in the creation of a spatial sinusoidal electro-magnetic field capable of reactivating the deactivated magnetic tag located in the vicinity of said face.

A stable non-rotating position of said magnets, at which each magnet faces said face by one of its poles, enables the deactivation of a magnetic tag located in the vicinity of said face of the magnetic assembly. Therefore, the magnetic assembly can be used for both deactivation and reactivation of the magnetic tag.

The magnetic tag may be located close to a barcode presented on an item. For example, the magnetic tag (i.e., a combination of two magnetic elements) and the barcode may be located on a common substrate attached to the item. The combination of the barcode and magnetic tag, either located on a common substrate or not, shall be referred to hereinbelow as "an information and security utility".

According to yet another aspect of the present invention, there is provided a scanner device to be applied to an information and security utility presented on an item, the scanner device comprising:

(i) an identification assembly capable of identifying a nature of an item of customer's interest, and generating data indicative thereof; and (ii) a magnetic assembly selectively operable for deactivating a magnetic tag to prevent detection of the tag by an external magnetic security system, or reactivating the deactivated tag to allow its detection by the external magnetic security system, the magnetic assembly comprising at least one permanent magnet operable to create a DC magnetic field capable of deactivating the magnetic tag, and being mounted for rotation to create a spatial sinusoidal electro-magnetic field capable of reactivating the deactivated magnetic tag.

It should be understood that the scanner device may be part of the trolley mountable unit of the customer station, or may be used by a cashier.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
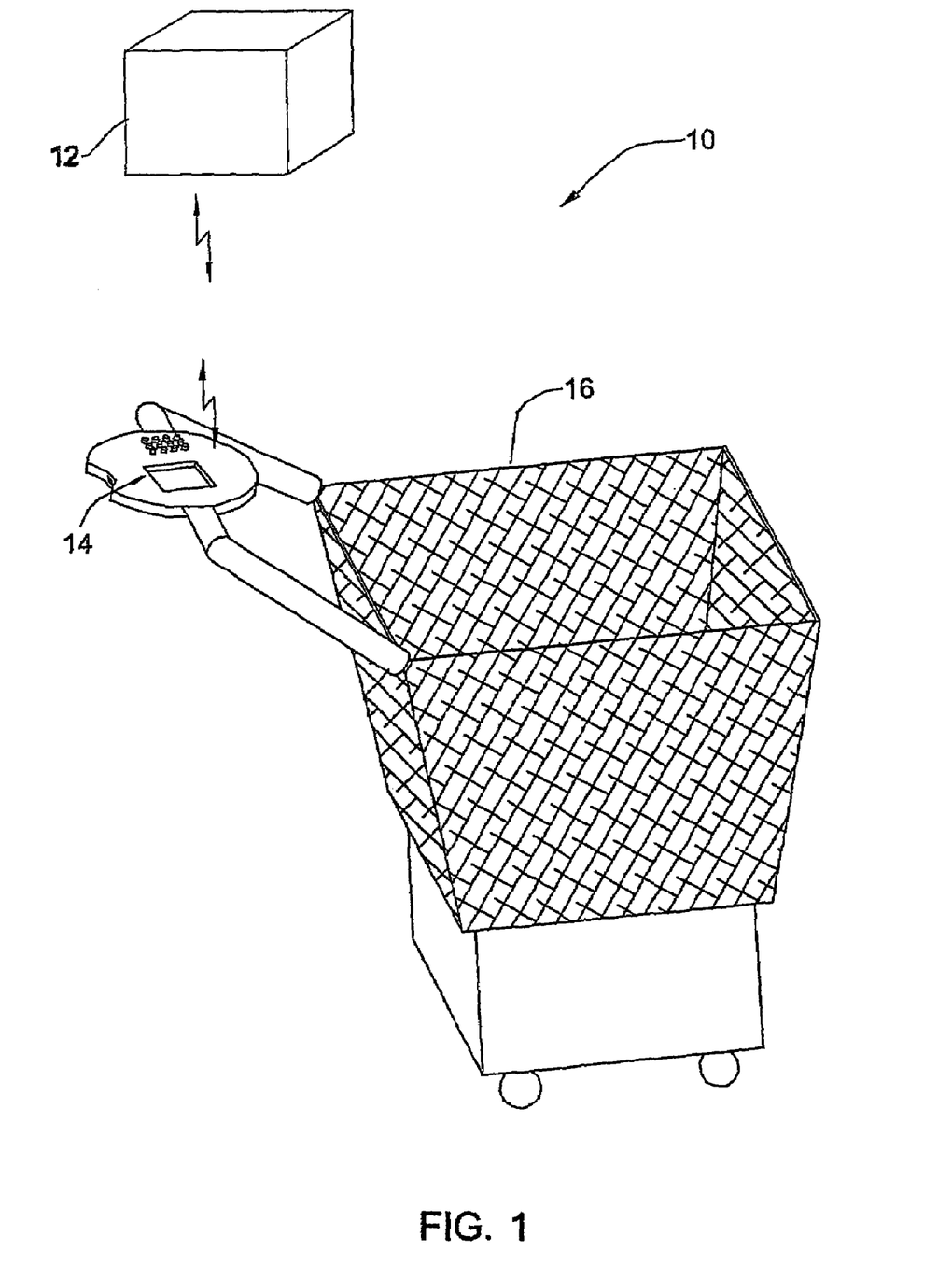
FIG. 1 is a schematic representation of a system according to the invention.

Referring to FIG. 1, there is illustrated an items purchasing system 10 according to the invention. The system 10 comprises such main constructional parts as a central station 12, and a plurality of user stations (customer stations) 14 (only one such station being shown in the figure). In the present example, the customer stations are mounted on store trolleys 16. The stations 12 and 14 are wireless connectable to each other for data transmission between them, as will be described more specifically further below. In other words, the central station 12 and trolley-mountable units 14 are connected to each other through a wireless Local Area Network (LAN). Additionally, although not specifically shown, a bag-holder is provided mountable on the trolley. Such a bag-holder may be of a conventional type typically used in supermarkets.

The control station 12 is typically a computer system having a memory for storing reference data representative of various items available in the store including their identification codes, nature and current prices, and a processing means for processing data received from the user's stations. Also stored in the central station is data representative of various registered customers, namely, those who have previously purchased item(s) in the store. The construction and operation of such a central station do not form part of the present invention, and therefore need not be specifically described, except to note the following. The central station is responsive to data coming from the user's stations to register "new" customers and update reference data representative of the registered customers, to transmit information to the trolley-mountable unit, and to enable the payment transactions.

The customer station 14 is an automatic payment and security system (Smart Electronic Shopping Cart). It should be noted, although not specifically shown, that the entire station 14 or at least some parts thereof may be associated with a stand-alone unit. Hence, the stand-alone unit may replace the unit mounted on the store, or together with the trolley-mountable unit present the customer station. If the elements of the customer station are partly located in the trolley-mountable unit and partly located in the stand-alone unit, signal transmitting/receiving means may be appropriately provided in these remote units.

Figure 2A:
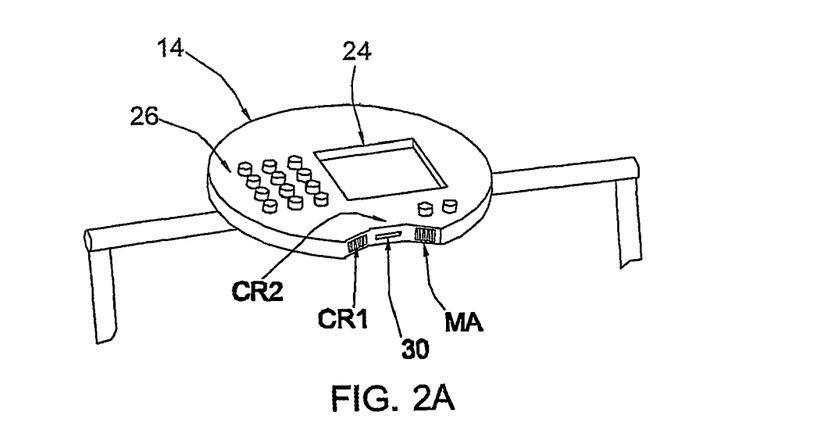
FIGS. 2A and 2B show, respectively, a schematic representation of a customer station for mounting on a store trolley, and the main functional elements of the customer station.
Figure 2B:
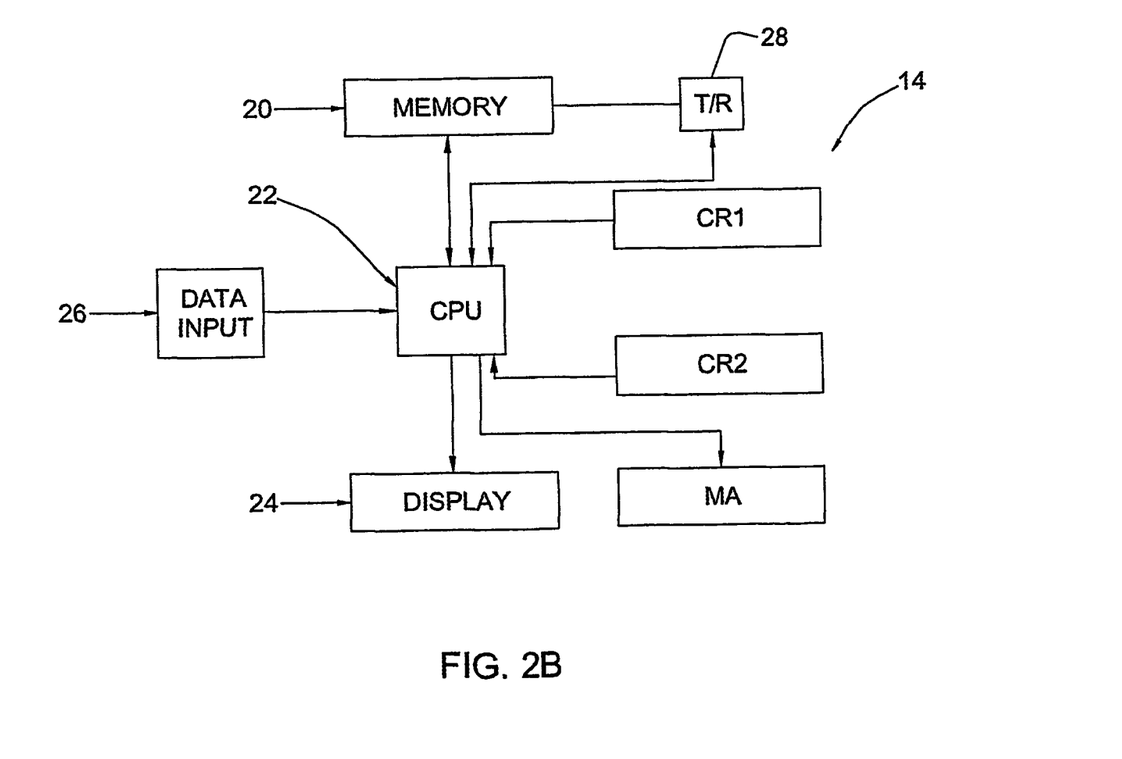

Reference is made to FIGS. 2A and 2B showing more specifically the trolley-mountable station 14. The latter comprises a memory unit 20, a processor 22, a display 24 (constituting a data presentation unit), a first code reader $CR_1$ (constituting an identification assembly), a second code reader $CR_2$, a magnetic assembly MA, a data input unit 26 (e.g., keyboard), and a data transmitter/receiver unit 28.

The memory unit 20 stores reference data representative of various items available in the store including their identification codes, nature and current prices, and is associated with the data transmitter/receiver unit 28 that receives the reference data and its updated contents from the central station 12. The processor 22 is operated by the central station (through the unit 28) and by a customer (through elements $CR_1$, $CR_2$, and 26).

The first code reader $CR_1$ comprises an optical means for reading a bar code presented on each item (constituting an item identification code) and generating data indicative thereof in the conventional manner. Thus, the customer, while selecting a specific item and deciding to purchase the selected item (or at least to clarify information related to this item), brings the item close to the code reader $CR_1$ so as to enable the code reader to scan the bar code on the item. It should be noted, although not specifically shown, that the code reader itself may be mounted on an extendable holder, so as to bring the code reader close to the item located in the trolley. Data generated by the code reader $CR_1$ is immediately received by the processor 22, which analyzes this data and utilizes the reference data in the memory 20 to actuate the presentation of the information related to the item on the display 24.

The second code reader $CR_2$ is of a conventional type capable of reading a customer's payment card identification code and generating data indicative thereof. To this end, the unit 14 is formed with a slot 30 for inserting the customer's card therein so as to have access to the reader $CR_2$. The same code reader $CR_2$ or an additional one (not shown) is used for identifying the customer via his personal store card. Data indicative of the customer and his purchasing habits (selected item) is transmitted to the central station 12.

The assembly MA is designed so as to deactivate and reactivate, if desired, a magnetic security element mounted on each item in the store. The deactivation of the selected item is needed to prevent customers from putting items in their trolleys without performing the purchasing procedure. The latter consists of the following. The customer, having clarified the information related to the selected item (by the code reader $CR_1$) and decided to purchase this particular item, has to push a corresponding button of the data input unit 26, thereby adding the item's nature and price to the entire list of purchased items for payment transaction purposes. If the item was selected and put into the trolley without performing the purchasing procedure, this will be detected at the exit gate when the customer leaves the store.

It should be noted that the first code reader $CR_1$ and the assembly MA may be operable together, so as to simultaneously scan the relevant data presented on the item (its bar code, and magnetic security element). To this end, the magnetic security element and the barcode are incorporated within the same label attached to the item and present together the information and security utility, as will be described more specifically further below.

The reactivation of the magnetic security element is needed when a customer regrets the decision to purchase the item. This eliminates the need for special personnel of the store to be responsible for re-magnetizing the item. The customer thus reactivates the item by means of the assembly MA, and returns the item onto the shelf. It should also be noted that the processor 22 may operate the assembly MA to deactivate a selected item, only after the receipt of data indicative of that the purchasing procedure was completed (i.e., the code reader $CR_1$ scanned the bar code and the customer pressed button).

The processor 22 is preprogrammed to be responsive to the item's ID to enable the identification all the information related to the item including and in addition to its nature and price. Hence, data displayed to the customer includes currently available sales for items of the same nature; the existence, location of items of the same nature, etc.

Figure 3:
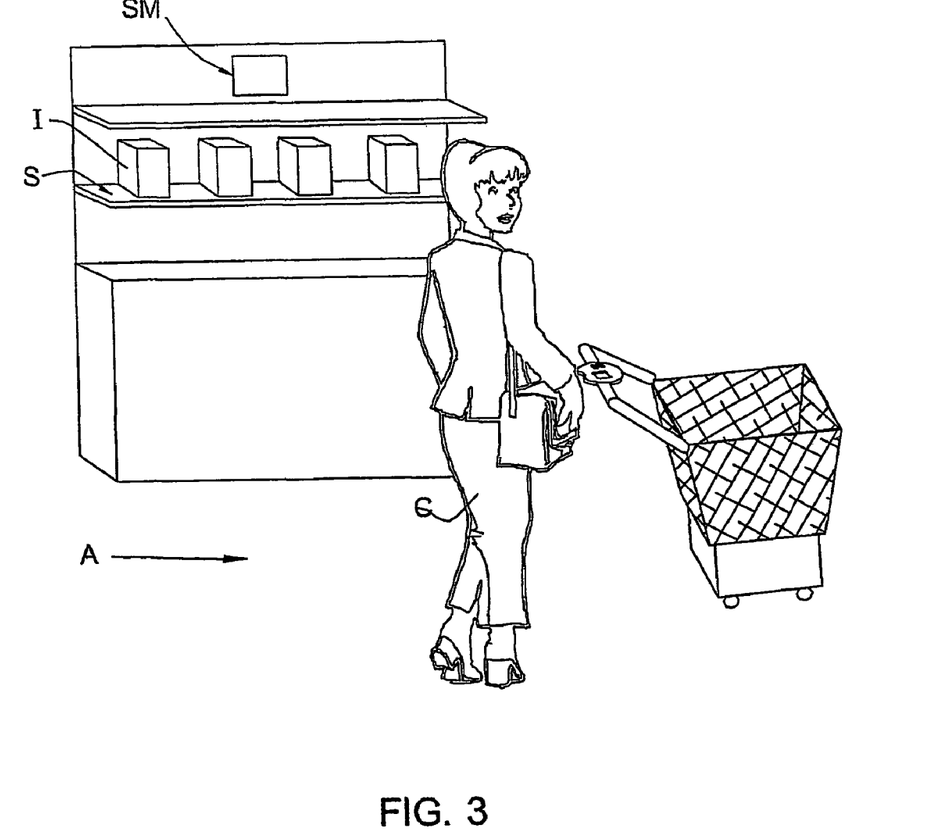
FIG. 3 schematically illustrates an example for the implementation of an identification assembly of the system according to the invention.

Turning now to FIG. 3, there is illustrated a customer C that passes along an aisle A next to a shelf S with a plurality of items I, and pushes his trolley 16 equipped with the customer station 14. The shelf S is furnished with a sensor means SM mounted preferably at a height corresponding to that of the average person. The sensor means is of the kind capable of detecting the existence of a customer pausing in the aisle (indicative of that the customer is interested in items on the respective shelf) and generating data indicative'thereof. The data generated by the sensor means is of the kind enabling its wireless transmission to the trolley-mountable unit 14 (e.g., RF or infra-red format). The data generated by the sensor is also indicative of a shelf identification code, being thereby indicative of the nature of items located thereon.

In this case, although not specifically shown, the receipt of this data at unit 14 is carried out either through the same data transmitting/receiving unit 28 or an additional unit. The unit 28 is appropriately connected to the processor 22, which analyzes data coming from the sensor to identity an item of the customer's interest, and enables the presentation of the respective data to the customer on the display 24.

Generally speaking, the system of the invention comprises means for locating the customer travelling in the store. This may be implemented also by preprogramming the user's station 14 to periodically transmit a signal to the central station 12, where this signal is processed to determine the present location of the customer with respect to the items distribution in the store.

It is important to note that the central station 12 is the so-called expert system capable of carrying out a learning mode with respect to each registered customer, in response to updated information supplied from the trolley-mountable unit. In other words, the customer's purchasing profile is dynamically updated, and item-related information presented to the customer is managed accordingly.

Generally, a magnetic security technique for use in stores for selling items typically needs three main components: a magnetic tag to be attached to an item; an external magnetic security system (typically incorporated in an exit gate); and a magnetic deactivator/reactivator for shifting the magnetic tag between its active and passive states to be, respectively, detectable and non-detectable by the magnetic security system. The external security system is of the kind capable of generating an AC magnetic field to excite the magnetic tag located within the AC magnetic field region, detecting a response of the tag, and generating a warning signal.

Figure 4:
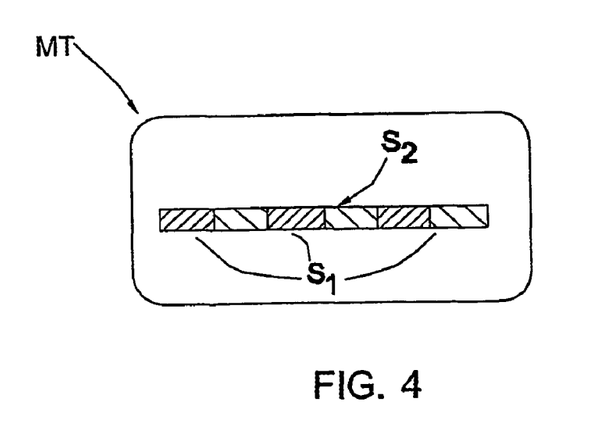
FIG. 4 is a schematic illustration of a magnetic security tag suitable to be used with the present invention.

FIG. 4 illustrates a magnetic tag MT of the kind suitable to be used with the present invention. Magnetic tags are security elements attachable to items to prevent thefts, and typically comprise magnetic elements made of amorphous materials with different magnetic properties. Thus, the magnetic tag MT comprises two magnetic strips $S_1$ and $S_2$ made of, respectively, hard-magnetic and soft-magnetic materials, which are supported on a substrate or paper base (the provision of which is optional). In the present example, the magnetic strips are located on top of each other, namely, the hard magnetic strip $S_1$ is located above the soft magnetic strip $S_2$. The hard magnetic strip $S_1$ is composed of multiple segments arranged in a spaced-apart relationship above the soft magnetic strip $S_2$.

The hard-magnetic strip is shiftable between its passive and active states, such that only in the passive state of the hard-magnetic strip, a response of the soft-magnetic strip to an external magnetic field generated by an external security system (typically incorporated in an exit gate) can be detected. In other words, the passive state of the hard-magnetic strip corresponds to the active state of a magnetic tag, in which it can be detected, and the active state of the hard-magnetic strip corresponds to the passive state of the tag, in which it is non-detectable.

The soft magnetic strip, when exposed to a certain external magnetic field, produces a unique magnetic response (the so-called "Finger Print") to the external field that can be appropriately detected as changes in the external magnetic field. The unique response depends on both the properties of the soft-magnetic material of the strip (i.e., chemical and geometrical characteristics), and on the external magnetic field to which the strip is exposed. The longer the soft-magnetic strip, the stronger the response produced by the strip. Similarly, the stronger the external field, the stronger the response of the soft-magnetic strip. When the external magnetic field effect is removed, the soft-magnetic material reverts to an inert state (no remnant magnetism), in which it has a flat hysteresis loop. The hard magnetic strip is typically of the kind capable of becoming a magnet (active) or being in an inert state (passive). This phenomenon is known per se and related to as a "Magnetic Memory". The magnetic memory in its passive and active states presents magnets with, respectively, north-south and south-north orientation of the poles (both affecting the soft-magnetic strip). When the hard magnetic strip in a tag is in its normally passive state, it presents no magnetic field as compared to the magnetic field created by the external magnetic security system incorporated in an exit gate. The soft-magnetic strip located within the magnetic field created by the external magnetic security system generates a response of sufficient strength to the external magnetic field of the security system, and the tag can therefore be detected by the security system.

Hence, when an item carrying an active magnetic tag (with the hard-magnetic strip in its passive state) passes through the magnetic field region created by the exit gate, the latter detects changes of this magnetic field caused by the response of the soft-magnetic strip, and generates an alarm signal. To deactivate the magnetic tag (i.e., to shift the hard-magnetic strip from its normally passive state to the active state), the tag should be exposed to a DC magnetic field, which causes the magnetization of the hard-magnetic strip.

The magnetic assembly MA according to the invention is designed to operate with a battery power source, and, in order to save the battery's power, utilizes a magnetic field created by permanent magnets (rare earth magnets). Generally, the use of only one permanent magnet is sufficient, but the use of several magnets is preferred, in order to reduce the dependence of the magnetic assembly operation on the relative location of the magnetic tag with respect to the magnetic assembly.

Figure 5A:
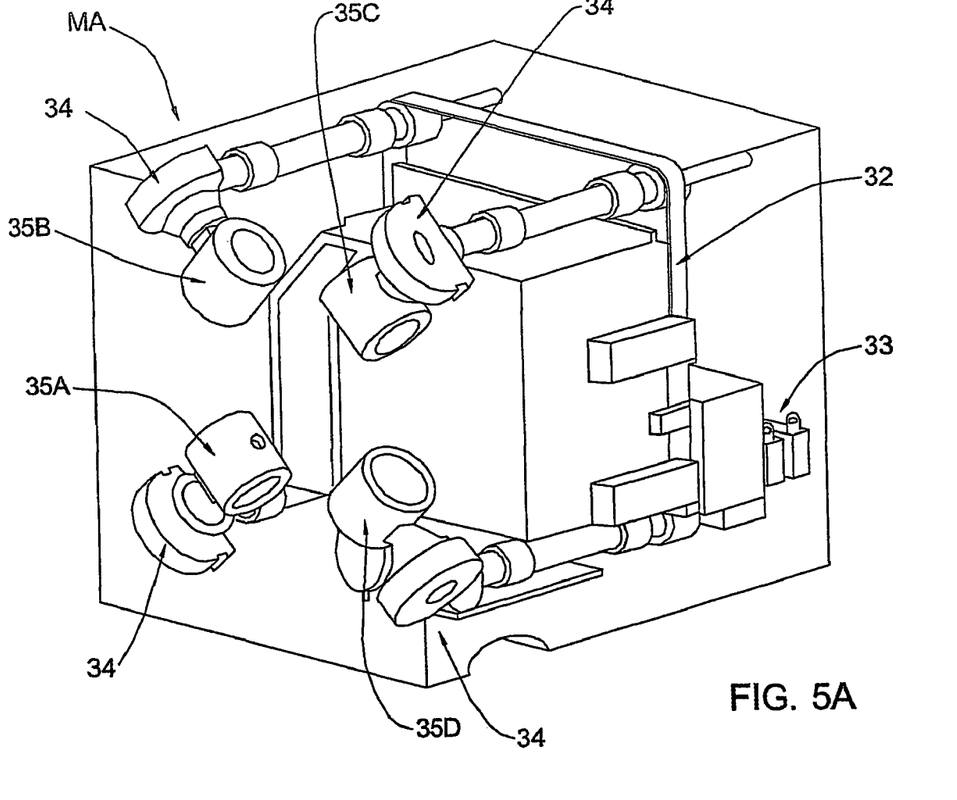
FIGS. 5A and 5B illustrate an example of a magnetic device according to the invention.
Figure 5B:
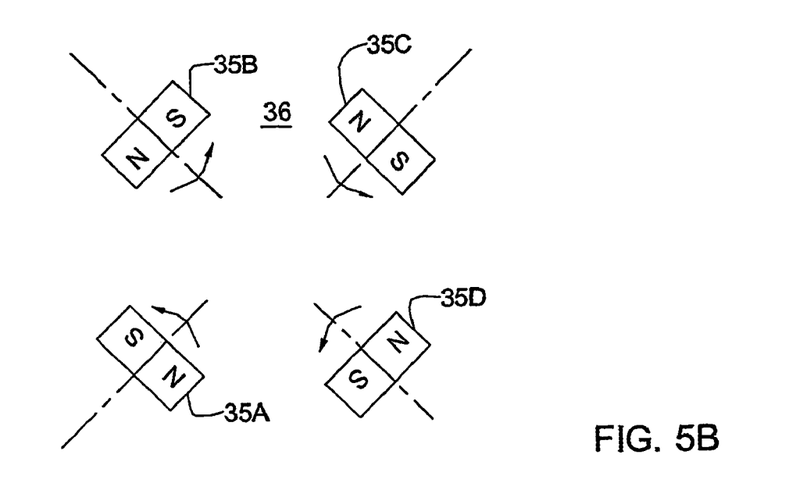

FIGS. 5A and 5B illustrate an example of the magnetic assembly MA comprising such main constructional parts as a driving motor 32, a driving belt 33 operated by the motor 32, gear drive mechanisms 34, and four permanent magnets 35A, 35B, 35C and 35D. The magnets 35A–35D are mounted at a face 36 of the assembly MA by which the device faces a magnetic tag to be deactivated/reactivated. The magnets are assembled and belt rotated by the single driving motor 32, such that their angular velocities are synchronized and identical, the rotation of the magnets creating a spatial sinusoidal electro-magnetic field. As better shown in FIG. 4B, each magnet is rotatable about an axis perpendicular to the direction of magnetization of the magnet A stable non-rotating position of the magnets, at which each magnet faces the face 36 by one of its poles, enables the deactivation of the magnetic tag located in the vicinity of the face. A stable rotation state of all the magnets results in the creation of a spatial sinusoidal electro-magnetic field capable of reactivating the deactivated magnetic tag, while being moved away from the face of the magnetic assembly MA. In the present example, all the magnets are rotatable in the same direction with respect to the respective axis of rotation.

It should be noted that the use of four permanent magnets is shown as a non-limited example only, and any other number of spaced-apart permanent magnets may be used (generally, at least one such magnet). Additionally, it should be noted although not specifically shown that in general, the magnetic assembly according to the invention may comprise one or two permanent magnets mounted stationary and specifically oriented for magnetic tag-deactivation purposes, and at least one permanent magnet mounted for rotation for magnetic tag-reactivation purposes.

When a customer scans a selected item intending to purchase this item, the magnets 35A–35D are in their non-rotating position, the hard magnetic strip ($S_1$ in FIG. 2) of the magnetic tag is thereby magnetized (shifted to its active state), and the tag is neutralized (deactivated) being in its passive state.

When the customer desires to return the item previously scanned (to thereby remove this item from the list of purchased items), indicating so via the user interface (26 in FIG. 3A), the magnets 35A–35D are rotated at a frequency of 20 Hz exhibiting a magnetic field of a sinuous wave form. This sine form field combined with the removal of the item away from the magnetic assembly MA results in demagnetizing the hard magnetic strip of the tag, therefore reactivating the tag.

Figure 6:
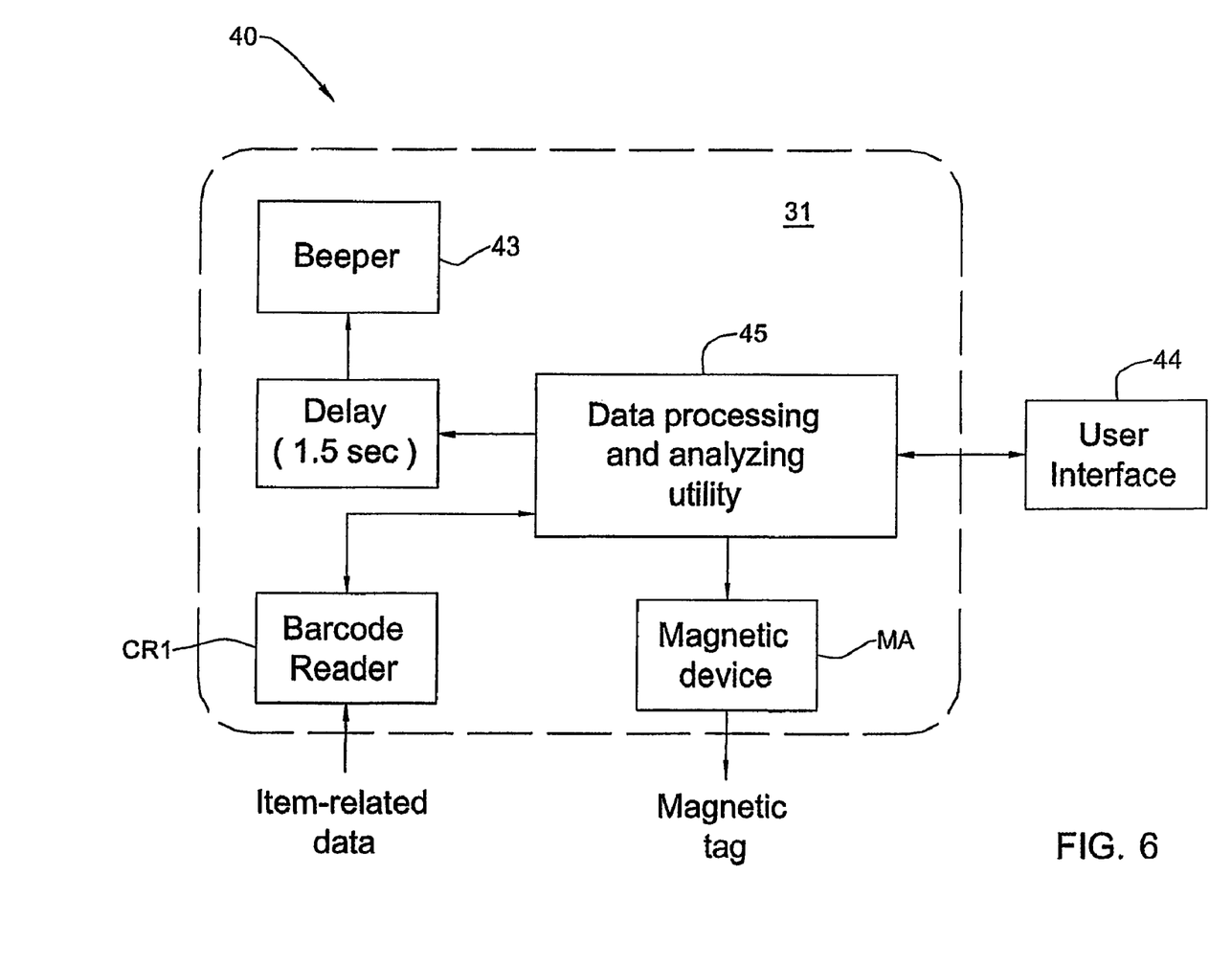
FIG. 6 illustrates a block diagram of a scanner device according to the invention, which can be used as a part of a customer station (e.g., of the trolley mountable unit), or may be a separate device to be used by a cashier.

FIG. 6 illustrates a block diagram of the main components of a scanner device 40 suitable for use in an automatic payment and security system according to the invention. The device 40 may be part of the customer station (e.g., incorporated in the trolley mountable unit, or the so-called "smart electronic shopping cart") or may be a separate device to be used by a cashier. The scanner device 40 comprises an identification assembly composed of a barcode reader $CR_1$ and an indication means (beeper) 43; the magnetic assembly MA; an interface utility 44 (e.g., press buttons, and display), and a controller (processor) 45.

It should be understood that when using the magnetic assembly MA as part of the automatic payment and security system, only a valid scan of the bar code scanner $CR_1$ is a valid command to the motor in the assembly MA to provide the stable (non-rotating) position of the permanent magnets and create the DC magnetic field that neutralizes the tag. This is associated with the following. If the magnetic field was present all the time, one may deliberately fail to scan the item (by hiding the barcode label). However, by bringing the item closer to the magnets, the tag will be neutralized. Similarly, when the customer operates the magnetic assembly MA (through the interface utility) to disregard the purchase of a selected item, the device MA waits for a valid scan of the barcode scanner $CR_1$, which triggers the motor of the magnetic assembly MA to rotate the permanent magnets.

In order to accelerate the permanent magnets 35A–35D of the assembly MA, and bring them to the stable rotation, a certain time is required until the actual process of demagnetization of the hard magnetic strip (reactivation of the tag) may be initiated. This is achieved by utilizing a signal generated by the barcode reader $CR_1$. This signal is identified by the processor as a valid scan event, and the processor thus generates a signal to the motor 32 of the magnetic assembly MA to thereby activate it to rotate the magnets 35A–35D. Upon completion of the reactivating process, the processor generates a signal directed to the beeper and an indication sound signal is generated. In this way, the customer is acknowledged only after the completion of the whole reactivating process, and not immediately after the scan stage. The nominal time delay of the reactivation process is about 1.5 seconds. It should be understood that the provision of a beeper is optional, and an indication signal may be a visual signal presented on the display.

Having completed the purchase, the customer, with his items (e.g., items contained in the trolley) passes about or through an exit gate (the external magnetic security system). Such a gate typically includes two coils, a power coil and a detector coil. The power coil generates a specific magnetic field capable of triggering the soft-magnetic strip in the magnetic tag to emit its "Finger Print", and the detector coil is a very sensitive device designed to detect the "Finger Print" signal of the tag. It should be understood that the magnetic field generated by the power coil is not sufficiently strong to toggle the state of the hard-magnetic strip. Thus, if a customer leaves the store with at least one item with the non-deactivated security element (magnetic tag), the gate will detect this and generate a warning signal in a conventional manner.

The advantages of the present invention are thus self-evident. The system of the present invention utilizes such a trolley-mountable unit that turns the trolley into a "Smart Electronic Shopping Trolley", enabling the following:

identification of a customer, his location in the store, his purchasing habits;

presentation of all items' related information to the customer in accordance with his purchasing profile;

performance of a purchasing procedure, as defined above; and performance of a security procedure (deactivating the purchased items, and reactivating the returned items).

The system of the present invention, on the one hand, assists customers in purchasing items, and, on the other hand, enables to prevent thefts.

Those skilled in the art will readily appreciate that various modifications and changes can be applied to the preferred embodiment of the invention as hereinbefore exemplified without departing from its scope defined in and by the appended claims.

The invention claimed is:

1. A customer station for use in an items purchasing system in a supermarket or other retail store, the customer station comprising:
    (a) an identification assembly capable of reading items' identification codes, identifying a nature of selected item of customer's interest, and generating data indicative of information related to the item of interest to be presented to the customer, said information including a current price of the selected item;
    (b) a data presentation unit for presenting to the customer information related to the selected items;
    (c) a tag deactivating and reactivating unit configured and operable to deactivate a security tag attached to the item to thereby prevent its identification by an external security assembly thus enabling identification of the respective item as a purchased one, and to reactivate the previously deactivated tag to thereby enable its identification as a non-purchased item; and
    (d) a control unit connectable to said identification assembly and to said tag deactivating and reactivating unit, and comprising a processor utility and an indication utility, said control unit being configured and operable to be responsive to the generated data indicative of the information related to the item to operate the tag deactivation upon identifying a valid scan event from the identification assembly, thereby enabling the identification of the respective item as the purchased one and include the item data into a list of purchased items, and to be responsive to a signal indicative of the completion of the reactivation process to remove the non-purchased item data from the list and activate the indication utility to generate an acknowledge signal.

2. The customer station according to claim 1, and also comprising a memory unit for storing reference data representative of various items available in the store including their identification codes, nature and current prices.

3. The customer station according to claim 2, wherein the identification assembly comprises a code reader/identifier for reading an identification code of each item selected by the customer and utilizing the reference data for identifying the item's nature and price.

4. The customer station according to claim 3, wherein said identification assembly also comprises a sensor capable of identifying a customer passing through the aisle and generating data indicative thereof.

5. The customer station according to claim 4, wherein said identification assembly comprises a wireless connecting unit for wireless communication with a central station enabling to locate the customer with respect to items distribution in the store.

6. The customer station according to claim 2, wherein said memory unit is equipped with a signal receiving means for receiving updated contents of the reference data from a central station of the supermarket.

7. The customer station according to claim 1, and also comprising a code reading/identification unit for identifying a customer and determining his payment card identification code, and generating data indicative thereof, the control unit being responsive to the data indicative of the entire sum and to the generated data related to the customer's payment card, so as to finalize transaction.

8. The customer station according to claim 7, and also comprising a memory unit for storing reference data representative of various items available in the store including their identification codes, nature and current prices, and data representative of registered customers.

9. The customer station according to claim 1, incorporated in a unit mountable on a store trolley.

10. The customer station according to claim 1, wherein said identification assembly and said data presentation unit are incorporated in a unit mountable on a store trolley.

11. The customer station according to claim 10, wherein at least a part of said tag deactivating and reactivating unit operating as the deactivator is incorporated in said trolley mountable unit.

12. The customer station according to claim 11, wherein a part of said tag deactivating and reactivating unit operating as the reactivator for reactivating the previously deactivated tag is incorporated in said trolley mountable unit.

13. The customer station according to claim 11, wherein said control unit is incorporated in said trolley mountable unit.

14. The customer station according to claim 10, wherein said control unit is incorporated in said trolley mountable unit.

15. The customer station according to claim 1, wherein said tag deactivating and reactivating unit is a magnetic assembly operable to deactivate and reactivate a magnetic security tag.

16. The customer station according to claim 15, wherein said magnetic assembly comprises at least one permanent magnet operable to create a DC magnetic field capable of deactivating the magnetic tag.

17. The customer station according to claim 16, wherein said at least one permanent magnet is mounted for rotation to create a spatial sinusoidal electro-magnetic field capable of reactivating the deactivated magnetic tag.

18. The customer station according to claim 1, wherein the identification assembly comprises a code reading/identification unit for identifying a customer by reading a code on the customer's personal card, and generating data indicative thereof.

19. An items purchasing system for use in a supermarket or other retail store, the system comprising a central station for storing reference data, and a plurality of customer stations connectable to said central station, the customer station comprising:
(a) a memory unit for storing said reference data, wherein the memory unit is equipped with a signal receiving means for receiving updated contents of the reference data form said central station;
(b) an identification assembly capable of reading items' identification codes, identifying a nature of selected item of customer's interest, and generating data indicative of information related to the item of interest to be presented to the customer, said information including a current price of the selected item;
(c) a code reading/identification unit for identifying a customer and determining his payment card identification code, and generating data indicative thereof;
(d) a data presentation unit for presenting to the customer information related to the selected items;
(e) a tag deactivating and reactivating unit configured and operable to deactivate a security tag attached to the item to thereby prevent its identification by an external security assembly thus enabling identification of the respective item as a purchased one, and to reactivate the previously deactivated tag to thereby enable its identification as a non-purchased item;
(f) a control unit connectable to said identification assembly and to said tag deactivating and reactivating unit, and comprising a processor utility and an indication utility, said control unit being configured and operable to be responsive to the generated data indicative of the information related to the item to operate the tag deactivation upon identifying a valid scan event from the identification assembly, thereby enabling the identification of the respective item as the purchased one and include the item data into a list of purchased items, and to be responsive to a signal indicative of the completion of the reactivation process to remove the non-purchased item data from the list and activate the indication utility to generate an acknowledge signal.

20. A trolley for use by a customer in a supermarket or other store, the trolley comprising a unit mounted on the trolley and comprising:
(a) an identification assembly capable of reading items' identification codes, identifying a nature of selected item of customer's interest, and generating data indicative of information related to the item of interest to be presented to the customer, said information including a current price of the selected item;
(b) a data presentation unit for presenting to the customer information related to the selected items;
(c) a tag deactivating and reactivating unit configured and operable to deactivate a security tag attached to the item to thereby prevent its identification by an external security assembly thus enabling identification of the respective item as a purchased one, and to reactivate the previously deactivated tag to thereby enable its identification as a non-purchased item;
(d) a control unit connectable to said identification assembly and to said tag deactivating and reactivating unit, and comprising a processor utility and an indication utility, said control unit being configured and operable to be responsive to the generated data indicative of the information related to the item to operate the tag deactivation upon identifying a valid scan event from the identification assembly, thereby enabling the identification of the respective item as the purchased one and include the item data into a list of purchased items, and to be responsive to a signal indicative of the completion of the reactivation process to remove the non-purchased item data from the list and activate the indication utility to generate an acknowledge signal.

21. A scanner device to be applied to an information and security utility presented on an item in a supermarket or other store, the scanner device comprising:
an identification assembly configured and operable for reading items' identification codes, identifying a nature of selected item of customer's interest, and generating data indicative of information related to the item of interest to be presented to the customer and including a current price of the selected item, and data indicative of a valid scan event; and
a magnetic assembly selectively operable by the control unit for deactivating a magnetic tag to prevent detection of the tag by an external magnetic security system, or reactivating the previously deactivated tag to allow detection of said tag by the external magnetic security system, the magnetic assembly comprising at least one permanent magnet operable to create a DC magnetic field capable of deactivating the magnetic tag, and being mounted for rotation to create a spatial sinusoidal electro-magnetic field capable of reactivating the deactivated magnetic tag; and a control unit connectable to said identification assembly and to said magnetic assembly, and comprising a processor utility and an indication utility, said control unit being configured and operable to be responsive to said data indicative of a valid scan event to operate the magnetic assembly to deactivate the tag thereby enabling identification of the respective item as a purchased one to include the item data into a list of purchased items, and to be responsive to a signal indicative of the completion of the reactivation process from the magnetic assembly and a valid scan from the identification assembly to allow removal of a non-purchased item data from the list and generation of an acknowledge signal to a customer.

* * * * *